US012789349B2

(12) United States Patent
Anderson

(10) Patent No.: US 12,789,349 B2
(45) Date of Patent: Nov. 10, 2026

(54) TOOL MOUNTABLE MULTI-BIT HOLDER

(71) Applicant: Benjamin S. Anderson, Kearney, MO (US)

(72) Inventor: Benjamin S. Anderson, Kearney, MO (US)

( * ) Notice: Subject to any disclaimer, the term of this patent is extended or adjusted under 35 U.S.C. 154(b) by 21 days.

(21) Appl. No.: 18/985,759

(22) Filed: Dec. 18, 2024

(65) Prior Publication Data

US 2025/0196312 A1 Jun. 19, 2025

Related U.S. Application Data

(60) Provisional application No. 63/611,641, filed on Dec. 18, 2023.

(51) Int. Cl.
*B25F 5/02* (2006.01)
*B23B 45/02* (2006.01)
*B25H 3/00* (2006.01)

(52) U.S. Cl.
CPC .............. *B25F 5/029* (2013.01); *B23B 45/02* (2013.01); *B25H 3/003* (2013.01)

(58) Field of Classification Search
CPC .......... B25F 5/029; B23B 45/02; B25H 3/003
(Continued)

(56) References Cited

U.S. PATENT DOCUMENTS 4,508,221 A * 4/1985 Olson .................... B25F 5/029
206/478
4,579,356 A * 4/1986 Welborn ............... B23B 45/006
248/314

(Continued)

FOREIGN PATENT DOCUMENTS

JP 8323652 A 12/1996
JP 2004174671 A 6/2004
WO 2022140862 A1 7/2022

OTHER PUBLICATIONS

Screenshot of BT/FX Drill Bit Holder from Amazon, https://www.amazon.com/Bit-Holder-DeWalt-holder-organizer/dp/B09R915B6T?th=1 (printed May 19, 2025).

(Continued)

*Primary Examiner* — Terrell L Mckinnon
*Assistant Examiner* — Michael McDuffie
(74) *Attorney, Agent, or Firm* — Hovey Williams LLP

(57) ABSTRACT

A carrier system holds and facilitates access to implements usable with any one of a variety of tools. The carrier system includes a universal holder and a plurality of distinctive tool-attaching adapters. The universal holder defines implement-receiving openings, each of which is configured to receive a corresponding one of the implements therein. Each of the tools defines a distinctive carrier-receiving portion. Each of the tool-attaching adapters is engageable with and complementally corresponds to a respective one of the carrier-receiving portions. The universal holder is individually securable to the tool-attaching adapters. The universal holder is mountable to each the tools upon engagement of a selected one of the tool-attaching adapters with the respective one of the carrier-receiving portions, attachment of the selected one of the tool-attaching adapters to the respective one of the carrier-receiving portions, and securement of the universal holder to the selected one of the tool-attaching adapters.

22 Claims, 7 Drawing Sheets

(58) Field of Classification Search
USPC .............. 248/205.1, 686, 51, 52, 314, 309.1
See application file for complete search history.

(56) References Cited

U.S. PATENT DOCUMENTS

| | | | | | |
|---|---|---|---|---|---|
| 4,797,040 | A * | 1/1989 | Hibbard | B25B 23/00 | 248/205.2 |
| 4,932,294 | A * | 6/1990 | Chang | B25F 5/02 | 81/177.4 |
| 5,188,242 | A * | 2/1993 | Smith | B25F 5/029 | 248/205.3 |
| 6,964,545 | B1 * | 11/2005 | Languasco | B25F 5/029 | 362/120 |
| 7,591,616 | B1 * | 9/2009 | Kerner | B25F 5/029 | 408/124 |
| 8,066,268 | B2 * | 11/2011 | Brauer | B25F 5/029 | 269/130 |
| 10,183,394 | B1 * | 1/2019 | Dagnan, III | B65D 25/10 | |
| 12,023,795 | B1 * | 7/2024 | Yaski | B25F 5/029 | |
| 12,544,905 | B2 | 2/2026 | Fischer et al. | | |
| 2007/0175785 | A1 * | 8/2007 | Sharp | B25F 5/029 | 206/373 |
| 2010/0122926 | A1 * | 5/2010 | Tocco | B23B 31/1071 | 29/700 |
| 2013/0186794 | A1 * | 7/2013 | Kinskey | B25H 3/021 | 206/372 |
| 2014/0060285 | A1 * | 3/2014 | Bradfield | G10G 7/00 | 84/411 R |
| 2014/0097217 | A1 * | 4/2014 | Walsh | A45F 5/02 | 224/268 |
| 2016/0243695 | A1 * | 8/2016 | Billups, Jr. | B25H 3/003 | |
| 2017/0095921 | A1 * | 4/2017 | Madsen | B25F 5/029 | |
| 2017/0282351 | A1 | 10/2017 | Da Rosa | | |
| 2020/0055176 | A1 * | 2/2020 | Curchod | B25B 21/007 | |
| 2020/0094396 | A1 * | 3/2020 | Steiner | B25H 3/003 | |
| 2023/0364771 | A1 | 11/2023 | Craig et al. | | |
| 2024/0359307 | A1 * | 10/2024 | Rocklitz | B25F 5/029 | |

OTHER PUBLICATIONS

Screenshot of Maverick3D Dewalt Magnetic Bit from Etsy, https://www.etsy.com/listing/1565175934/dewalt-magnetic-bit-holder-made-in-the (printed May 19, 2025).
Screenshot of BPOPO Magnetic Bits Holster from Amazon, https://www.amazon.com/Upgraded-Magnetic-Holster-Attach-Universal/dp/B0BTHRWK91?th=1 (printed May 19, 2025).
Screenshot of Galactic Gadgets for Various Magnetic Bit Holders, https://www.galacticgadgets.co/category/cordless-drill-accessories/ (printed Apr. 10, 2025).
Screenshot of StealthMounts 4590 Magnetic Bit Holder from Fasteners Inc, https://www.fastenersinc.net/products/stealthmounts-4590-magnetic-bit-holder-for-makita-cxt-lxt-xgt-tools (printed Apr. 10, 2025).
Screenshot of Xinxinlin Drill Bit Holder Kit from Amazon, https://www.amazon.com/Holder-Cordless-Replace-Magnetic-Attachment/dp/B0CHS3VFN1 (printed May 19, 2025).
International Search Report and Written Opinion for PCT Application No. PCT/US2024/060747 (Dated Apr. 16, 2025).
Screenshot of SKCMOX Bit Holder from Amazon, https://a.co/d/fQkg2GH (printed Jun. 2, 2025).

* cited by examiner

TOOL MOUNTABLE MULTI-BIT HOLDER

CROSS-REFERENCE TO RELATED APPLICATIONS

The present application claims priority from U.S. Provisional Patent Application No. 63/611,641, filed Dec. 18, 2023, and entitled TOOL MOUNTABLE MULTI-BIT HOLDER, the entire disclosure of which is hereby incorporated by reference herein.

BACKGROUND OF THE INVENTION

1. Field of the Invention

The present invention relates generally to a carrier system for mounting to a tool and facilitating access to a plurality of implements usable with the tool.

2. Discussion of the Prior Art

Various tools, including power tools such as drills, are conventionally configured for use with any of a plurality of implements. For instance, a drill is conventionally configured to accept a variety of distinct bits, each of which includes a distal end for performing a desired function. For example, one bit might include a screwdriver-type end, whereas another bit might include an auger-type end.

Changing of the implements during use of the tool is conventionally relatively time-consuming and/or inconvenient, as the desired implement must be remotely stored (e.g., in a shop drawer, on a work surface, or in a toolbox) or carried separately by the user (e.g., in a tool bag, by hand, etc.) More particularly, tools conventionally lack on-board storage for implements; and those which do include storage are typically significantly limited in number of implements accommodated.

SUMMARY

According to one aspect of the present invention, a carrier system is provided. The carrier system is for holding and facilitating access to a plurality of implements usable with any one of a variety of tools. The tools have distinctive carrier-receiving portions. The carrier system includes a universal holder and a plurality of distinctive tool-attaching adapters. The universal holder defines a plurality of implement-receiving openings, each of which is configured to receive a corresponding one of the implements therein. Each of the tool-attaching adapters is engageable with and complementally corresponds to a respective one of the carrier-receiving portions. The universal holder is individually securable to the tool-attaching adapters. The universal holder is mountable to each the tools upon engagement of a selected one of the tool-attaching adapters with the respective one of the carrier-receiving portions, attachment of the selected one of the tool-attaching adapters to the respective one of the carrier-receiving portions, and securement of the universal holder to the selected one of the tool-attaching adapters.

According to another aspect of the present invention, a tool system includes a tool and a carrier system. The tool is for use with any of a plurality of implements. The carrier system is for holding and facilitating access to the implements. The tool defines a distinctive carrier-receiving portion. The carrier system includes a universal holder and a plurality of distinctive tool-attaching adapters. The universal holder defines a plurality of implement-receiving openings, each of which is configured to receive a corresponding one of the implements therein. The universal holder is individually securable to the tool-attaching adapters. A selected one of the tool-attaching adapters is engageable with and complementally corresponds to the carrier-receiving portion of the tool. The universal holder is mounted to the tool when the universal holder is secured to the selected one of the tool-attaching adapters engaged with the carrier-receiving portion and attached to the tool.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

Figure 1:
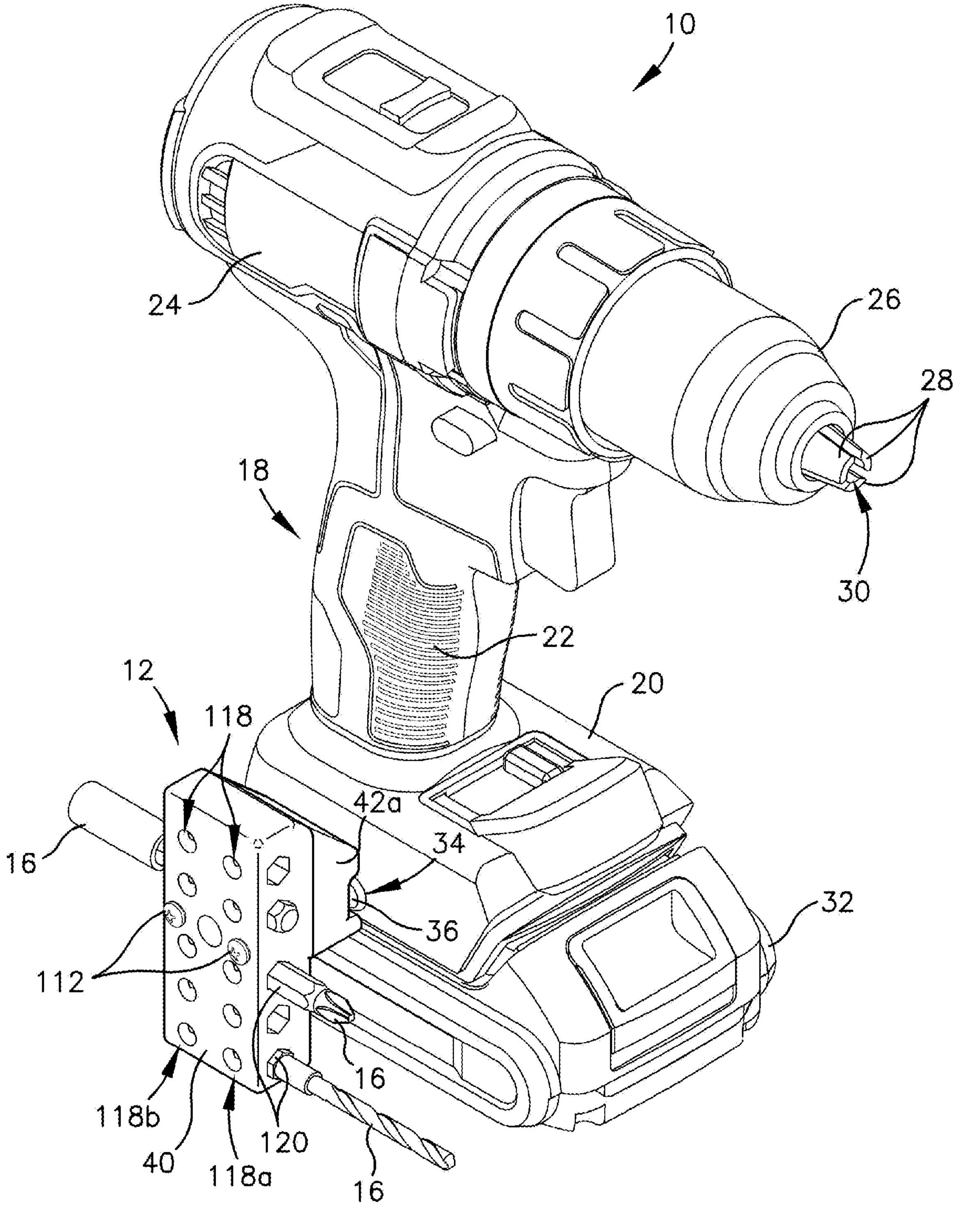
FIG. 1 is a perspective view of a tool, a selected assembly of a carrier system, and a plurality of implements in accordance with a preferred embodiment of the present invention.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Figure 2:
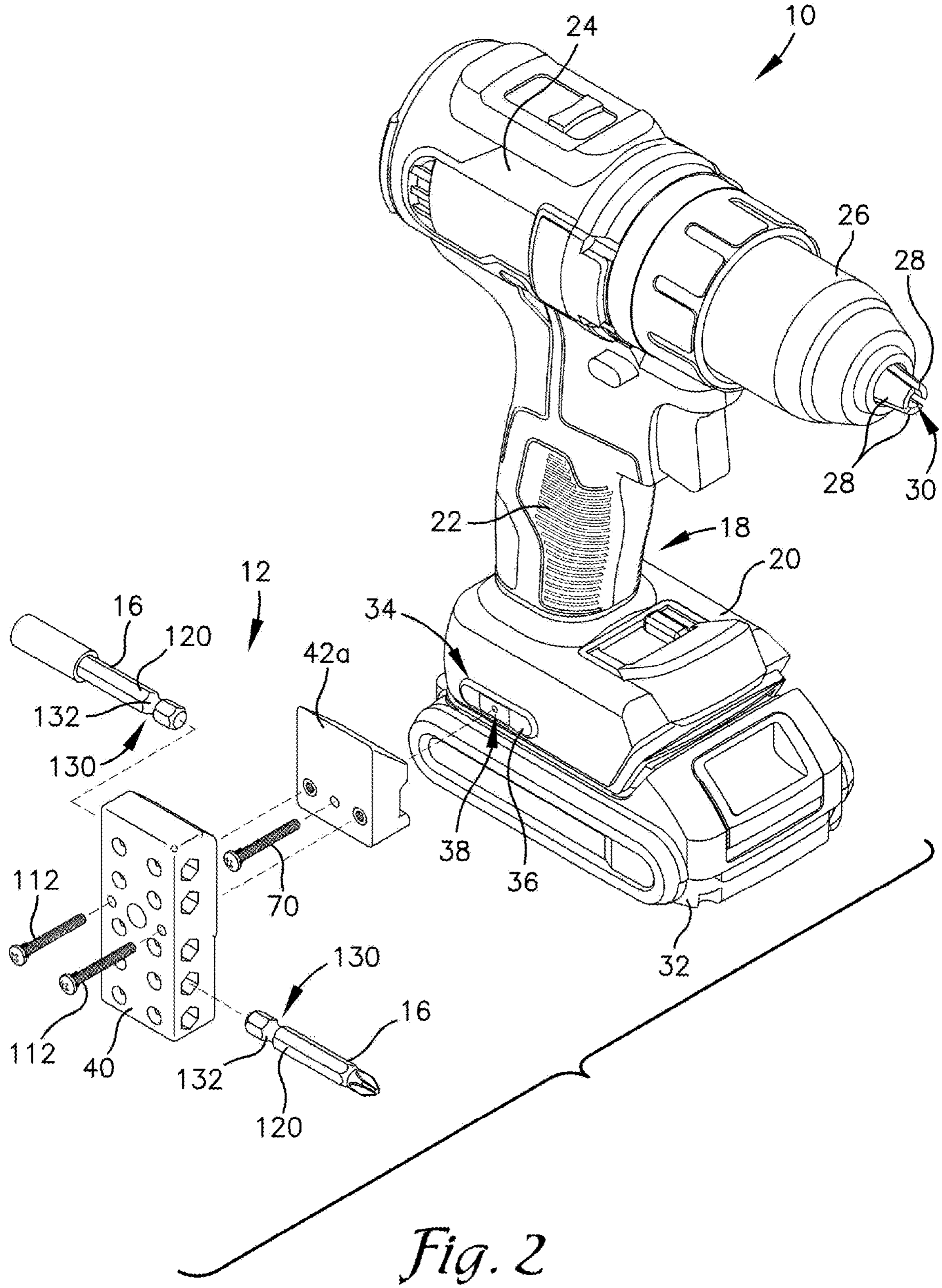
FIG. 2 is a partially exploded perspective view of the tool, the selected assembly, and the implements of FIG. 1.

With initial reference to FIGS. 1 and 2, a tool 10 and a selected assembly 12 of a broader carrier system 14 (see FIG. 3) are illustrated. The selected assembly 12 is mounted to the tool 10. As will be discussed in greater detail below, the carrier system 14 and, more specifically, the selected assembly 12 thereof, are provided to hold and facilitate access to a plurality of implements 16 that are usable with the tool 10.

The illustrated tool 10 is a battery-powered rotary drill, although other types of tools fall within the scope of some aspects of the present invention. For instance, the tool could alternatively be an impact driver.

The illustrated implements 16 are bits usable with the drill, although other types of implements fall within the scope of some aspects of the present invention. It is noted that the implements 16 may vary widely in type, including but not limited to drill bits of various diameters, screwdriver bits (including Phillips, square, flathead, star, etc.), socket bits, extension bits, and so on.

The tool 10 broadly includes a body 18 including a base 20, a grip area 22, and a head 24; an adjustable chuck 26 including a plurality of jaws 28 defining a forwardly disposed chuck opening 30; and a battery 32. The implements 16 are individually receivable in the chuck opening 30 and securable between the jaws 28 upon adjustment of the chuck 26.

The tool 10 also includes a carrier-receiving portion 34. In the illustrated embodiment, the carrier-receiving portion 34 includes a projecting platform 36 defining a mounting opening 38 therethrough. The mounting opening 38 is preferably threaded. The platform 36 preferably projects from the base 20 of the tool body 18, although other positioning of the carrier-receiving portion on the tool falls within the scope of some aspects of the present invention. (Positioning of the carrier-receiving portion will vary from tool to tool in keeping with the manufacturer's design.)

In the illustrated embodiment, the platform 36 is generally racetrack- or capsule-shaped, with straight top and bottom edges and rounded fore- and aft-ends. The mounting opening 38 is defined centrally in the platform 36 and extends through the platform 36 and into the base 20 of the tool body 18.

The carrier system 14 broadly includes a universal holder 40 and a plurality of distinctive tool-attaching adapters 42. In the illustrated embodiment of FIG. 3, three (3) distinct adapters 42*a*, 42*b*, and 42*c* are illustrated, although the system could alternatively include more than three (3) or only two (2) adapters.

The adapter 42*a*, which may also be referred to herein as the selected adapter 42, is engageable with and complementally corresponds to the carrier-receiving portion 34 of the tool 10. The other adapters 42*b* and 42*c* are engageable with and complementally correspond to carrier-receiving portions of other tools (not shown). That is, each adapter 42 is configured for use with a different tool (e.g., different brands, styles, etc.), with the selected adapter 42*a* being configured for use with the illustrated tool 10.

In the illustrated embodiment, the selected adapter 42*a* includes an adapter body region 44 and an adapter connection region 46. The adapter body region 44 and the adapter connection region 46 are integrally formed with each other in the illustrated embodiment, although discrete formation falls within the scope of some aspects of the present invention.

Preferably, the adapter body region 44 is generally right trapezoidal in cross-sectional form, including a tall holder side 48, a shorter connection region side 50 parallel to the holder side 48, a base 52 orthogonal to the sides 48 and 50, and a sloped or slanted top 54 extending between and connecting the sides 48 and 50 (opposite the base 52). Front and back faces 56 and 58 are also defined.

The adapter connection region 46 preferably includes a pair of ribs 60 and 62 extending from the connection region side 50 at the top and bottom thereof (i.e., adjacent the slanted top 54 and the base 52, respectively). The connection region 46 also preferably includes a contact region 64 defined by the connection region side 50.

As will be discussed in greater detail below, the ribs 60 and 62 and the contact region 64 cooperatively form a recessed area or slot 66 that at least in part receives the carrier-receiving portion 34 of the tool 10 therein, with the platform 36 and the connection region 46 most preferably being disposed in overlying engagement and with the ribs 60 and 62 capturing the platform 36 therebetween to restrict upward, downward, and/or rotational motion thereof relative to the adapter 42*a*.

In a preferred embodiment, the adapter 42*a* defines a tool-attaching opening 68 therethrough. The tool-attaching opening 68 corresponds to the aforementioned mounting opening 38. The carrier system 14 preferably includes a tool-attaching fastener 70 that extends through both the tool-attaching opening 68 and the mounting opening 38 to additionally secure the adapter 42*a* to the tool 10. That is, the ribs 60 and 62 and the tool-attaching fastener 70 cooperatively secure the adapter 42*a* to the tool 10.

In the illustrated embodiment, the tool-attaching fastener 70 is a threaded bolt. However, other fastener types may be additionally or alternatively provided. For instance, screws, adhesives or glues, magnets, latches, hooks, and/or other elements fall within the scope of some aspects of the present invention.

The adapter 42*a* further preferably defines a pair of holder-attaching openings 72, the function of which will be described in greater detail below. Preferably, the holder-attaching openings 72 are disposed on laterally opposed sides of the tool-attaching opening 68. However, other configurations fall within the scope of some aspects of the present invention.

It is noted that the other adapters 42*b* and 42*c* include both similarities and differences relative to the selected adapter 42*a*. For instance, similarly to the selected adapter 42*a*, the adapters 42*b* and 42*c* each include generally right trapezoidal bodies 74 and 76, respectively, that present respective sloped or slanted tops 78 and 80.

Like the ribs 60 and 62 of the adapter 42*a*, ribs 82 and 84 are presented by the adapter 42*c*, but with differing shapes and proportions. While the adapter 42*b* does not include a pair of ribs, analogous enclosing structure 86 is presented.

Furthermore, whereas the adapter 42*a* defines the recessed area or slot 66, the adapters 42*b* and 42*c* present respective recessed areas 88 and 90.

Figure 3:
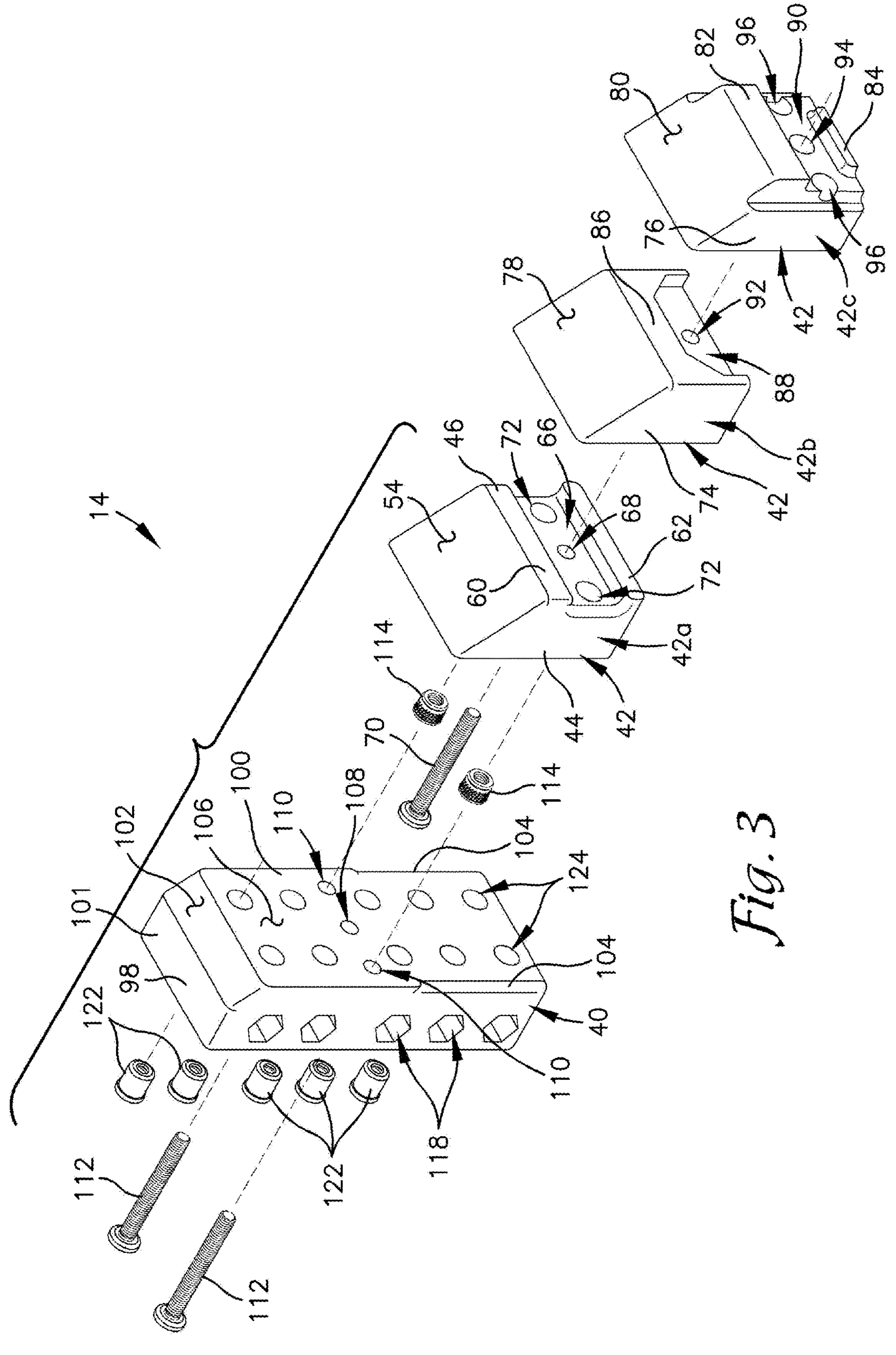
FIG. 3 is an enlarged, exploded perspective view of a carrier system in accordance with a preferred embodiment of the present invention, wherein the carrier system includes the selected assembly of FIGS. 1 and 2 and a pair of additional adapters.

Further still, each of the adapters 42*b* and 42*c* similarly defines a centralized tool-attaching opening 92 or 94, respectively, and a pair of holder-attaching openings (only the openings 96 of the adapter 42*c* being visible in FIG. 3).

It is particularly noted that the openings 68 and 72 of the adapter 42*a*, the opening 92 and the not illustrated holder-attaching openings of the adapter 42*b*, and the openings 94 and 96 of the adapter 42*c* are consistently sized, shaped, and positioned from one adapter 42 to another along the holder-facing sides thereof. That is, the holder-facing opening arrangement of each adapter 42*a*, 42*b*, and 42*c* is consistent from one to another. As will be apparent from the following description, the consistent holder-facing opening arrangement is important so that the single (universal) holder 40 is useable with all the adapters 42.

More broadly, as will also become apparent upon further discussion below, the various differences between the adapters facilitate their use with distinct tools, whereas the various essential similarities therebetween enable their interchangeable attachment to the universal holder 40 and their similar functionality in a general sense.

The universal holder 40 preferably includes a holder body region 98 and a holder connection region 100. The holder body region 98 and the holder connection region 100 are integrally formed with each other in the illustrated embodiment, although discrete formation falls within the scope of some aspects of the present invention.

Preferably, the holder body region 98 is generally rectangular in form and includes a flat top 101. The holder connection region 100, in contrast, preferably includes a sloped or chamfered upper face 102 and chamfered lower inner edges 104. The holder connection region 100 also preferably defines a mounting face 106.

The holder 40 preferably defines a countersunk tool-attaching aperture 108 therethrough. More particularly, the tool-attaching aperture 108 preferably extends through the mounting face 106 and corresponds to the tool-attaching opening 68 defined by the adapter 42*a* (and, likewise, the openings 92 and 94 of the adapters 42*b* and 42*c*, respectively).

The holder 40 further preferably defines a pair of adapter-attaching openings 110 therethrough. More particularly, the adapter-attaching openings 110 extend through the holder body 98 and the mounting face 106 and correspond with the holder-attaching openings 72 of the adapter 42*a* (and, likewise, the corresponding openings of the adapter 42*b* and the openings 96 of the adapter 42*c*).

More particularly, the tool-attaching aperture 108 and the adapter-attaching openings 110 of the holder 40 are alignable with tool-attaching opening 68 and the holder-attaching openings 72 of the selected adapter 42*a*. (As will be readily apparent from the above, the holder 40 is also thus likewise alignable with the various openings of the adapters 42*b* and 42*c*.)

In keeping with this feature, it is noted that the carrier system 14 preferably includes a pair of adapter-attaching fasteners 112, each of which extends through a corresponding one of the adapter-attaching openings 110 in the holder 40 and into the corresponding one of the holder-attaching openings 72 in the selected adapter 42*a* to secure the holder 40 and the adapter 42*a* to one another. As will be discussed below, the carrier system 14 includes features within the holder-attaching openings 72 of the selected adapter 42*a* to facilitate secure interconnection of the holder 40 and the adapter 42*a*. (Securement of either of the adapters 42*b* and 42*c* to the holder 40 is similarly possible.)

Furthermore, the aforementioned tool-attaching fastener 70 preferably extends through the tool-attaching aperture 108 of the holder 40 in addition to extending through the tool-attaching opening 68 of the selected adapter 42*a* and the mounting opening 38 of the tool 10 itself. (Again, it is emphasized that similar attachment may occur with either of the adapters 42*b* or 42*c* provided in place of the adapter 42*a* if an appropriate tool—i.e., one presenting an appropriately complementary mounting platform for the adapter 42*b* or 42*c*—is provided.)

In the illustrated embodiment, the adapter-attaching attaching fasteners 112 are threaded bolts. However, other fastener types may be additionally or alternatively provided. For instance, screws, adhesives or glues, magnets, latches, hooks, and/or other elements may be provided without departing from the scope of some aspects of the present invention.

As will be readily apparent to those of ordinary skill in the art, rotational tightening of the various fasteners 70 and 112 will draw the holder 40, the selected adapter 42*a*, and the tool platform 36 toward one another until the adapter 42*a* is in contact with both the platform 36 and the holder 40. More particularly, as noted previously, the platform 36 will be received in the adapter slot 66, in overlying engagement with the contact region 64, and captured between the ribs 60 and 62. Furthermore, the holder side 48 of the adapter 42*a* will be disposed in overlying engagement with the mounting face 106 of the holder 40.

Thus, the holder 40 is securely mounted to the adapter 42*a* (or the adapter 42*a* is securely mounted the holder 40) and, in turn, to the tool 10.

In a preferred embodiment, the holder 40 and the adapter 42 each comprise a synthetic material such as a plastic. More preferably, the holder 40 and the adapter 42 comprise a moldable plastic and are formed via a molding process such as injection molding. Other materials, including metals, may alternatively be used. Furthermore, other formation processes, including but not limited to casting, machining, and/or 3D printing, fall within the scope of some aspects of the present invention, however.

In a preferred embodiment, the carrier system 14 includes a pair of inserts 114 received in the holder-attaching openings 72 (or 96 or not shown) of each adapter 42 to aid in securement of the adapter-attaching fasteners 112 without stripping out or otherwise damaging the plastic material of the given adapter 42. The illustrated inserts 114 are preferably internally threaded to complement the adapter-attaching fasteners 112, although other types of connection are within the ambit of some aspects of the present invention. Further, the inserts 114 in a preferred embodiment are heat set inserts, although other insert types and installation methods fall with the scope of some aspects of the present invention. Inserts may also be omitted in some cases.

Figure 4:
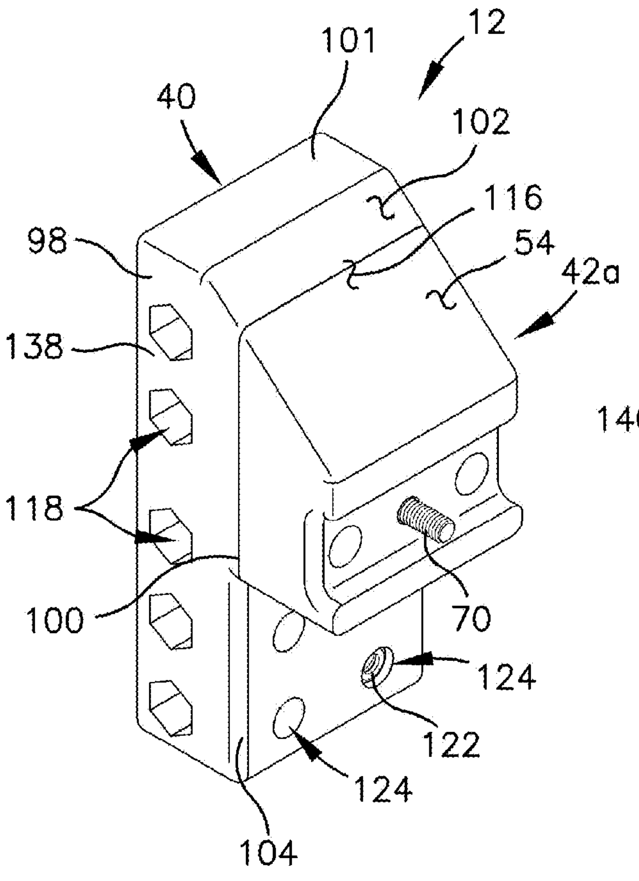
FIG. 4 is an inner perspective view of the selected assembly of FIGS. 1-3.
Figure 5:
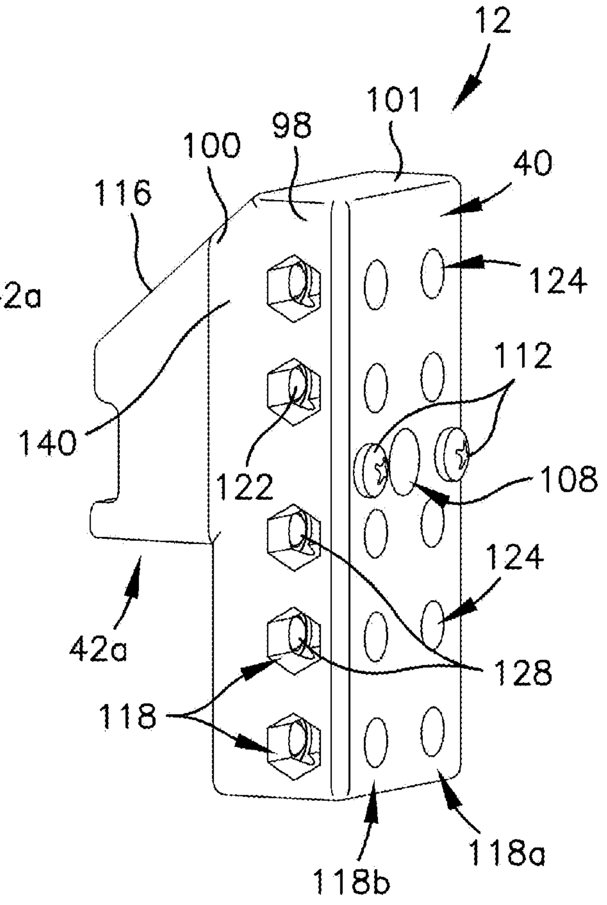
FIG. 5 is an outer perspective view of the selected assembly of FIGS. 1-4.
Figure 6:
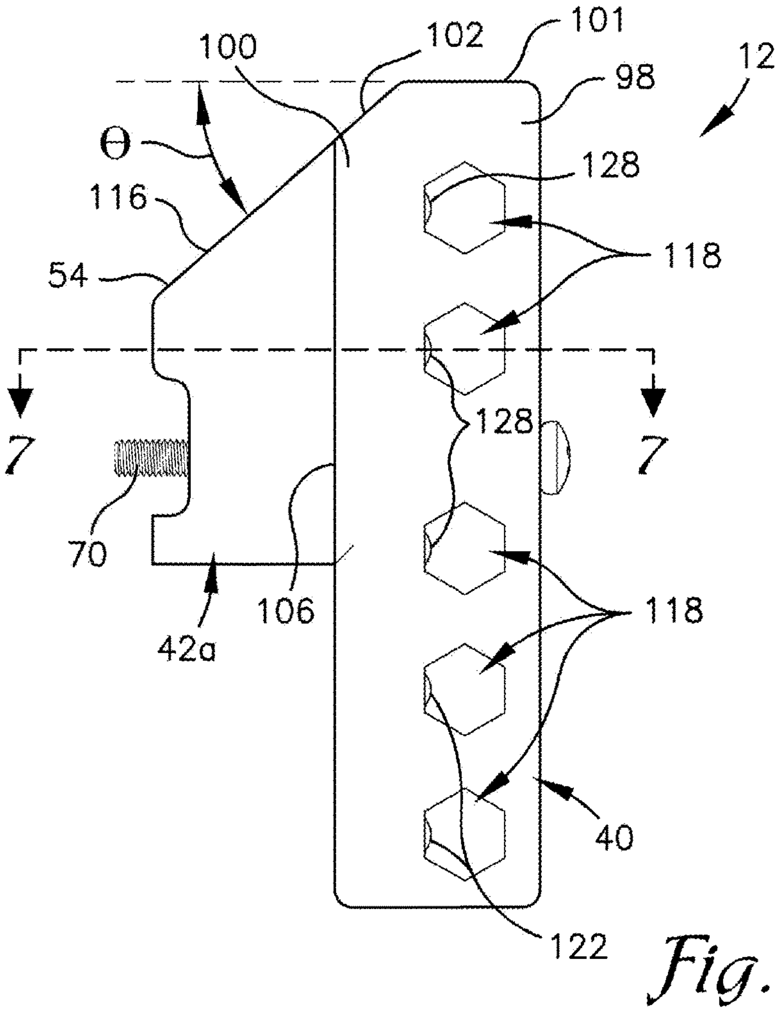
FIG. 6 is a rear view of the selected assembly of FIGS. 1-5.

As best shown in FIGS. 4-6, the chamfered upper face 102 of the holder 40 and the slanted top 54 of the adapter 42*a* preferably correspond to one another (i.e., share a slope), such that a continuously sloped upper surface 116 is defined. As will be discussed in greater detail below, the sloped upper surface 116 preferably provides "hand clearance" for a user when the selected assembly 12 is mounted to the tool 10 and the user is gripping the grip area 22.

It is noted that the slanted tops 78 and 80 of the adapters 42*b* and 42*c*, respectively, likewise preferably correspond to the upper face 102 of the holder 40.

In the illustrated embodiment, as best shown in FIG. 6, the sloped upper surface 116 preferably forms an angle θ relative to the plane of the flat top 101 of the holder body 98 of between about thirty (30) degrees and about fifty (50) degrees, more preferably between about thirty-five (35) degrees and about forty-five (45) degrees, and most preferably about forty (40) degrees.

As noted previously, the carrier system 14 is provided to hold and facilitate access to the plurality of implements 16 that are usable with the tool 10. More particularly, the holder 40 preferably defines a plurality of implement-receiving openings 118, each of which is configured to receive a corresponding one of the implements 16 therein.

Most preferably, the body 98 of the holder 40 defines the implement-receiving openings 118.

In a preferred embodiment, the implement-receiving openings 118 are hexagonal in cross-section, although other shapes fall within the scope of some aspects of the present invention. For instance, the openings could alternatively be in the form of slots, circles, rectangles or diamonds (rhombuses).

Furthermore, the implement-receiving openings 118 are all preferably of the same size, although size variations fall within the scope of some aspects of the present invention.

It is also preferable that, regardless of particular size or shape, the implement-receiving openings 118 are all congruent with each other. Again, however, incongruent variations fall within the ambit of some aspects of the present invention.

In the illustrated embodiment, the implement-receiving openings 118 are sized and shaped to complement and closely receive the shanks 120 of standard hex bits, such as those presented by the illustrated implements 16, such that the shanks 120 may be inserted via a slip fit but cannot rotate substantially within the openings 118.

For instance, in a preferred embodiment, the shanks 120 present a distance across flats of about six and three tenths (6.3) mm. The implement-receiving openings 118, in contrast, present a slightly larger distance across flats of between about six and seven tenths (6.7) and seven (7) mm.

It is particularly noted, however, that even implements that do not present a standard hexagonal portion (due to variations in size, shape, or both) may nevertheless be received in the holder. For instance, a fully cylindrical shank could be received in one of the implement-receiving openings, or a hexagonal shank having a smaller dimension could be inserted. Rectangular, diamond, and other shank cross-sectional shapes are also contemplated.

In a preferred embodiment, the housing body 98 defines a single, vertically extending column of the implement-receiving openings 118. However, multiple sets of columns could alternatively be provided, or the implement-receiving openings could be arranged in a non-columnar fashion (e.g., staggered). Most preferably, however, sufficient spacing is provided to facilitate "finger clearance" for a user inserting and/or extracting implements 16 from the implement-receiving openings 118. That is, it is preferred that the openings 118 be spaced in such a manner that insertion or extraction of a selected implement 116 is possible without contact being made by a user with another, non-selected implement 116.

The holder 40 further preferably includes a plurality of resiliently deformable securement elements 122, each of which is configured to selectively secure the corresponding one of the implements 16 in the corresponding one of the implement-receiving openings 118. As will be discussed in greater detail below, the holder 40 preferably defines a plurality of securement element openings 124 for receiving respective ones of the securement elements 122 therein.

Each of the securement elements 122 is preferably shiftable among neutral and loaded configurations and configured to engage and apply force to the corresponding one of the implements 16 when in one of the loaded configurations. Furthermore, as will be discussed in greater detail below, the securement elements 122 are most preferably configured to also restrict shifting of the corresponding implements 16 when the elements 122 are in the neutral positions.

In a preferred embodiment, each securement element 122 includes a resiliently deflectable actuator 126 and an engagement component 128 shiftable in correspondence with deflection of the actuator 126. As best shown in FIGS. 5 and 6, each engagement component 128 preferably at least in part obstructs the corresponding one of the implement-receiving openings 118 when the securement element 122 is in the neutral position and no implement 16 is inserted in the implement-receiving opening 118.

Insertion of an implement 16 into the implement-receiving openings 118, however, preferably results in contact between the implement 16 and the engagement component 128. Continued insertion results in deflection of the actuator 126 and shifting of the securement element 122 in a broad sense into one of the loaded configurations. As will be readily apparent to those of ordinary skill in the art, a force will also be applied to the implement 16.

In the illustrated embodiment, the shanks 120 of the implements 16 are each provided with a relief, recess, mounting groove, or necked groove 130 extending circumferentially or perimetrically about the shank 120 to define a smaller-diameter region or neck 132 of the shank 120.

In the illustrated embodiment, the groove 130 is arced in cross-section. Most preferably, the engagement components 128 are sized and shaped to correspond to the arced profiles of the grooves or recess 130.

For instance, in the preferred, illustrated embodiment, the securement elements 122 are ball-nose spring plungers 122, wherein the actuators 126 comprise compressible springs 126, and the engagement components 128 comprise balls or spheres 128. Other types of securement elements, including but not limited to threaded spring plungers or magnetic elements, fall within the scope of some aspects of the present invention, however. Further, in some alternative embodiments, the actuator and engagement element can be integrally formed.

Figure 7:
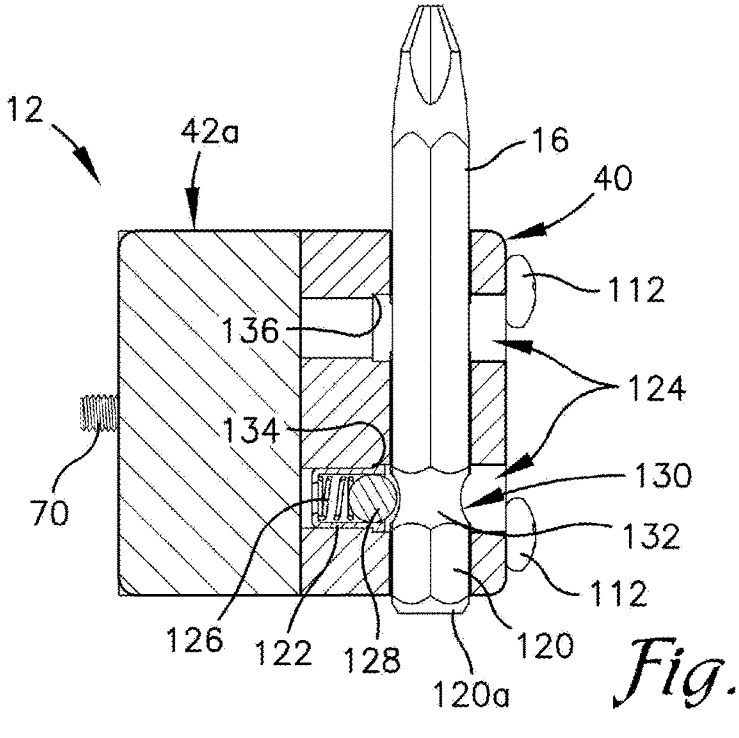
FIG. 7 is a cross-sectional top view, taken along line 7-7 of FIG. 6, of the selected assembly of FIGS. 1-6, with an implement received in the illustrated one of the implement-receiving openings.
Figure 8:
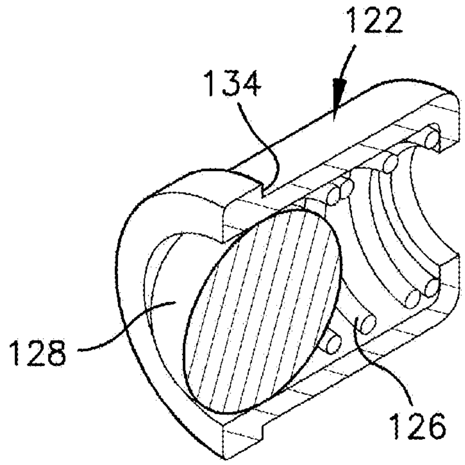
FIG. 8 is a greatly enlarged, cross-sectional perspective view of an engagement element of the selected assembly of FIGS. 1-7.
Figure 9:
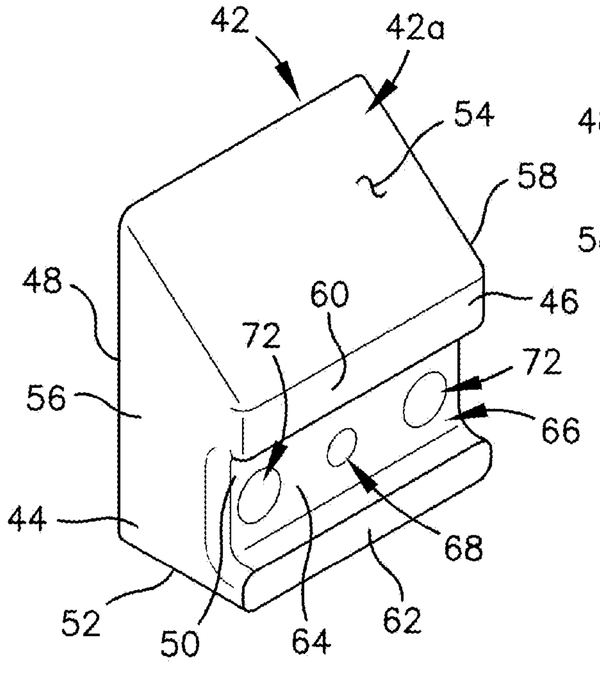
FIG. 9 is an inner perspective view of the adapter of the selected assembly of FIGS. 1-7.
Figure 10:
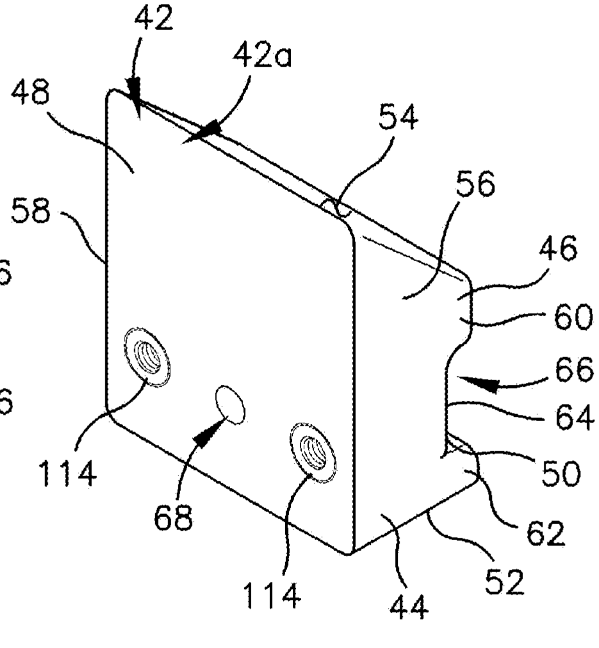
FIG. 10 is an outer perspective view of the selected adapter of FIGS. 1-7 and 9.

In a preferred embodiment, the balls 128 are preferably close in size to the grooves 130. As shown in FIG. 7, for instance, the balls 128 present radii and diameters slightly smaller than those of the arced profiles of the grooves 130 to facilitate positioning of the balls or spheres 128 within the grooves 130 when the corresponding securement elements 122 are in their neutral positions.

More specifically, in a preferred embodiment of the present invention, the balls 128 have radii of between about two and five tenths (2.5) and three (3) mm. The grooves 130 preferably have a height (in the direction of extension of the corresponding shank 120) of between about four and five tenths (4.5) and six (6) mm. The arcs defining the grooves 130 preferably have a radius of curvature between about three (3) and three and one tenth (3.1) mm.

When a given implement 16 is slid into a selected one of the implement-receiving openings 118, the shank 120 thereof preferably initially shifts relatively easily via the designed slip fit, before engaging the corresponding ball 128. Such engagement preferably results in deflection of the spring 126. Such deflection increases as continued motion of the shank 120 occurs, due to the curved surface of the respective ball 128.

Even further motion of the implement 16 through the implement-receiving opening 118 results in eventual "springing back" of the ball 128 into the recess or groove 130 as the engagement element 122 returns to its neutral position. With the ball 128 received in the groove 130, the implement 16 is selectively secured in the holder 40.

The implement 16 may then be selectively removed from the holder 40 upon a reversal of the above-described process, or alternatively upon a continuation of motion in the original direction. That is, the implement 16 may be inserted or removed in both "forward" and "backward" directions.

It is noted that the stiffness and length of the spring 126, the size of the ball 128, and other factors may be selected during design of the carrier system 14 to result in a desirable resistance to insertion and removal of a given implement 16. It is most preferred, however, that insertion and removal be relatively easy to facilitate efficient manual access and return of implements by a user. That is, insertion and removal should be achievable without exerting excessive force. This is in contrast to a variety of tool holders, including but not limited to interference-fit rubber holders or heavily magnetized holders.

It is also noted that the above-described resistance elements 122 may also be used for securement of implements that, unlike the illustrated implements 16, do not present a standard necked region or do not present a standard hexagonal shank. For instance, shanks having round or polygonal cross-sections of various sizes and no necks may permissibly be inserted in the holder, with the balls 128 engaging the shanks or other parts of the implements at any location available in order to provide a compressive force thereon. Such force may also result in shifting of the given implement into an off-center position within the corresponding opening, such that frictional forces against a wall defining the opening may be present.

As noted previously, the holder 40 defines the plurality of securement element openings 124. The securement element openings 124 preferably extend orthogonally to and intersect the implement-receiving openings 118.

In the illustrated embodiment, and as best shown in FIG. 5, two (2) mirrored sets or columns **118*a* and 118*b* of implement-receiving openings 118 are provided, with securement elements 122 being disposed only in the aft set 118*b*. (The openings in the fore set 118*a* are devoid of securement elements 122**.)

This configuration best facilitates a preferred forward orientation of the implements 16 (i.e., orientation in the direction of use). It is noted that a forward orientation facilitates straightforward and logical insertion and removal of implements 16 from both the holder 40 and the chuck 26 and avoids potential safety hazards associated with rearward projection of potentially sharp implements 16.

However, is noted that a user may choose, based on the desired functionality of the system 14, which of the implement-receiving openings 118 should be provided with a securement element 122 and in what direction to orient such securement element 122. For instance, a user might prefer to have an upper pair of implements oriented a first direction and a lower trio of implements oriented in a direction opposite the first direction. In keeping with this preference, the user might position an upper pair of securement elements in the upper pair of element-receiving openings in the front column and a lower trio of securement elements in the lower three element-receiving openings in the second column. The securement elements could in another alternative embodiment be staggered across the two columns.

Preferably, the positioning of the securement elements 122 (or, alternatively stated, the securement element openings 124) is such that a small portion **120*a* of a standard shank 120 captured by a corresponding securement element will project past the housing 40. Such exposed portion 120*a* advantageously facilitates pushing out of the implement 16** from a vantage point opposite the general orientation of the implement. This functionality may be particularly advantageous to break the inertia of an overly forceful or "difficult" securement element that has resisted reasonable front-applied pulling forces on a given implement.

In a preferred embodiment, the securement element openings 124 are sized and shaped to facilitate press-fitting of the securement elements 122.

Furthermore, each securement element 122 preferably defines a mounting ledge 134. The securement element openings 124 each preferably define an opposed pair of seats 136 (see FIG. 7; only one visible for each of the openings 124) for engaging the corresponding mounting ledge 134 when a securement element 122 is mounted therein.

Preferably, the holder 40 is symmetrical across a midplane extending orthogonally relative to the implement-receiving openings 118 and the mounting face 106 thereof; parallel to the securement element openings 124, the tool-attaching aperture 108, and the adapter attaching openings 110; equidistant between the front and back faces 138 and 140 thereof; and through the tool-attaching aperture 108.

The adapter **42*a* is also preferably symmetrical across a midplane thereof, wherein the midplane extends orthogonally relative to the contact region 64; parallel to the tool-attaching opening 68 and the holder attaching openings 72; equidistant between the front 56 and back 58; and through the tool-attaching opening 68**.

As will be readily apparent to those of ordinary skill in the art, the adapter midplane and holder midplane are preferably coextensive when the adapter **42*a* and holder 40 are secured to one another, with the selected assembly 12** in a general sense thereby presenting symmetry across the holder and adapter midplanes.

The remaining adapters **42*b* and 42*c* are likewise preferably symmetrical across respective midplanes thereof and, if attached to the holder 40**, would similarly present a shared midplane and overall assembly symmetry.

The symmetry of the assembly 12 facilitates mounting of the assembly 12 to either side of the tool 10, provided the tool 10 includes identical or sufficiently identical carrier-receiving portions 34 on both sides thereof. The system 14 therefore works equally well for both left- and right-handed use. Such bilateral usability is also enhanced by the customizable positioning of the securement elements 122, as described previously.

It is further noted that a pair of assemblies could be provided, with one mounted on each side of the tool. Stability of such a system could be enhanced through provision of a connective element extending between the assemblies and behind, below, or behind and below the battery.

The above-described system 14 is highly flexible, featuring a universal holder 40 that can hold and facilitate access to any of a plurality of implements 16 usable with any of a variety of tools, including but not limited to a tool such as the illustrated drill 10. The system 14 also includes not only the selected adapter **42*a* configured for use with the chosen tool 10 but a plurality of additional distinctive adapters 42*b* and 42*c*, as shown in FIG. 3, where each of the various distinctive adapters 42***a*, 42*b*, and 42*c* is engageable with and complementally corresponds to the carrier-receiving portion of a given distinctive tool.

Thus, the holder 40 can be readily mounted to any of a variety of tools (including different brands of tools) simply by mounting of the holder 40 to an appropriate adapter 42 configured for use with the desired tool.

A magnet or other element (e.g., a hook, latch, or complemental hook- or loop-structure) may be provided on the holder to facilitate mounting or storage of the holder. For instance, the holder could be hung from a nail or magnetically secured or Velcroed to a toolbox or frame.

In an exemplary method, a user first selects a tool (for present purposes, the tool 10) to be utilized based on the task or tasks to be accomplished. The user then inserts any necessary implements 16 into the universal holder 40 in any arrangement or direction desired by the user. The securement elements 122 may be repositioned if necessary or desired prior to this step. If desired, the implements 16 may be inserted into the universal holder 40 after the assembly 12 is installed on the tool 10.

It is noted that the implements 16 may be of a variety of types for everyday use, mixed-and-matched to achieve a particular goal, specialized for a specific type of work, or otherwise selected for any reason the user sees fit. For instance, a drill bit and Phillips bit could be paired for drilling a pilot hole and then screw a screw into the pilot hole. A star bit, drill bit, and socket bit could be carried to remove old screws, drill pilot holes, and fasten pieces together through the pilot holes.

The user then selects from the group of adapters 42 the one which corresponds to the carrier-receiving portion 34 of the tool 10. In the present instant, the appropriate adapter 42 is the adapter 42*a*. (Of course, other adapters configured differently from the illustrated adapters could also be provided, with such other adapters designed to complement other tools.)

The user next preferably secures the adapter 42*a* to the holder 40*a* using the adapter-attaching fasteners 112.

The resultant assembly 12 is then secured to the tool 10 by the user via positioning of the platform 36 in the slot 66 and insertion of the tool-attaching fastener 70 through the tool-attaching aperture 108, the tool-attaching opening 68, and the mounting opening 38.

It is noted that in an alternative embodiment method, the adapter could be secured to the tool prior to securement of the holder to the adapter.

In a preferred method, the user then proceeds to use the tool 10 with whichever implement(s) 16 are required, removing each implement 16 from the holder 40 as desired and thereafter replacing each implement in the holder 40.

Implements are quickly and easily accessible and changeable, without hand carrying thereof, use of a carrying bag or case, or searching. User productivity is thus increased.

The adapter 42 provides clearance between the tool 10 (including the battery 32 thereof) and the holder 40 and implements 16.

Furthermore, the sloped upper surface 116 provides "hand clearance" and thereby facilitates ergonomic and unobstructed use of the tool 10 by the user.

The selected assembly 12 is also relatively lightweight so as to cause minimal imbalance of the tool 10 and minimal increases in user fatigue.

Still further, the selected assembly 12 when mounted is disposed relative to a bottom surface of the tool 10 such that the tool 10 can be placed on such surface without obstruction/instability.

It is noted with regard to standing and stability that the illustrated embodiment, featuring five (5) implement-receiving openings 118, is configured to facilitate secure standing of most tools when used with standard (i.e., 1.5 A or equivalent) batteries or larger.

It is also noted that holders may suitably be lengthened to facilitate additional implement-receiving openings when such holders are to be used with larger (taller) batteries.

Finally, it is noted that some tools, as result of the positioning and design of their carrier-receiving portion(s), will be unable to stand unobstructed on a flat surface when the assembly is mounted thereto.

Figure 11:
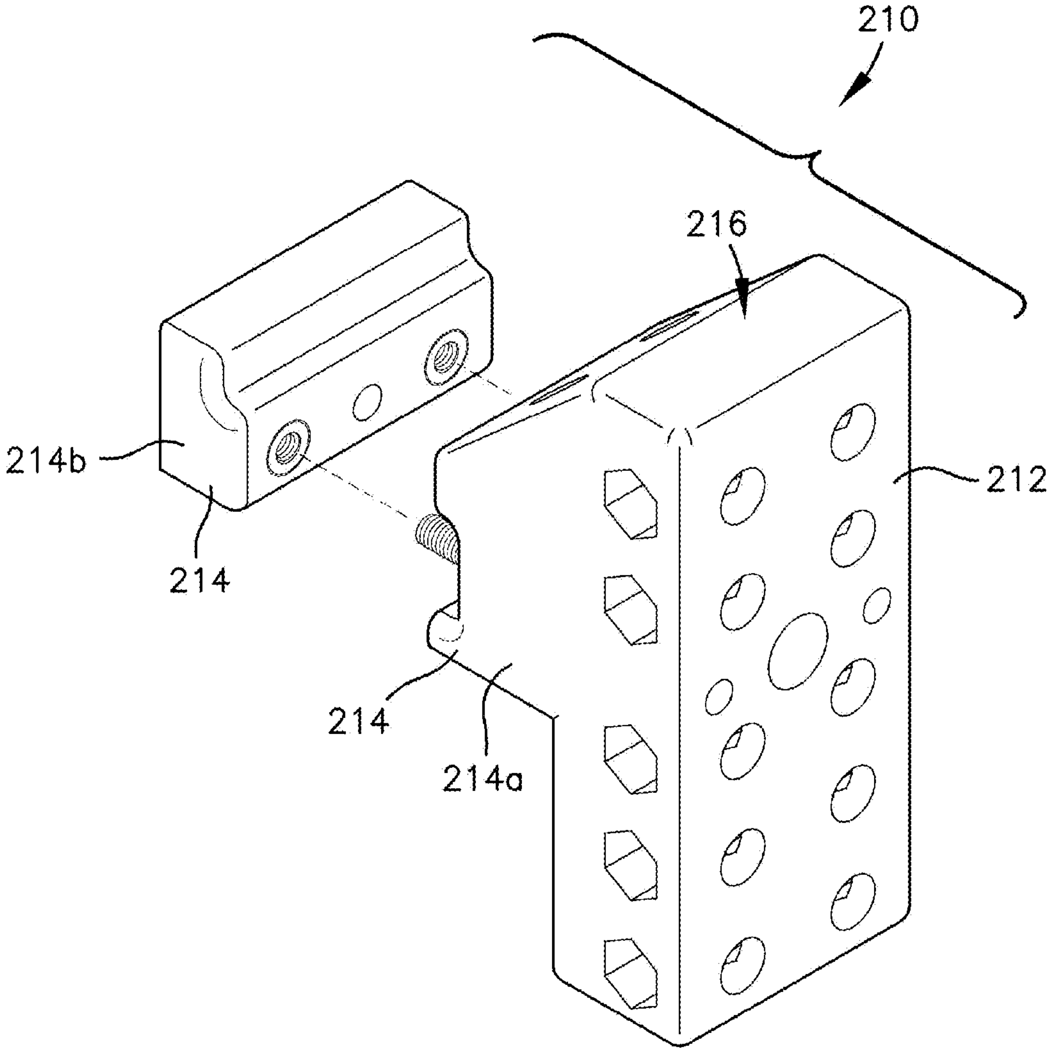
FIG. 11 is a partially exploded perspective view of a carrier system in accordance with a second preferred embodiment of the present invention.

A second preferred embodiment of the present invention is illustrated in FIG. 11. It is initially noted that, with certain exceptions to be discussed in detail below, many features of the carrier system 210 of the second embodiment are very similar to the carrier system 14 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Similarly to the carrier system 14 of the first preferred embodiment, the carrier system 210 of the second preferred embodiment broadly includes a universal holder 212 and a plurality of distinctive adapters 214. However, in the second embodiment, a first one of the adapters 214*a* is integrally formed with the holder 212, with the holder 212 and the adapter 214*a* forming a holder unit 216. A second one of the adapters 214*b*, in contrast, is discretely formed. (Additional discrete adapters are not illustrated but could be provided.)

As shown in FIG. 11, the integral adapter 214*a* and the discrete adapter 214*b* are each configured for use with distinct (i.e., not the same) tools. However, the integral adapter 214 is configured to be mountable to the first adapter 214*a* or, more broadly, the holder unit 216. The integral adapter 214 may thereby be secured relative to the holder 212.

Thus, the system 210 facilitates mounting of the universal holder 212 relative to either of two distinct tools via inclusion or exclusion of the discrete adapter 214*b* (i.e., via use of the holder unit 216 alone or the holder unit 216 and the discrete adapter 214*b* in combination).

A system 210 of this sort is advantageous if a user primarily uses the system 210 with only a single tool or with a set of tools having identical or very similar carrier-receiving portions, as is often the case within a given brand of tools. More particularly, because the adapter 214*a* suited for use with that tool or set of tools is integrally formed with the universal holder 212, it cannot get lost, and the unit 216 is advantageously and conveniently simplified and durable.

Flexibility of the system 210 is nonetheless retained, however, by provision of additional discrete adapters 214, such as the adapter 214*b*, that are configured for mounting to the integrated adapter 214*a* and make the system 210 usable with other tools when necessary.

Features of one or more embodiments described above may be used in various combinations with each other and/or may be used independently of one another. For instance, although a single disclosed embodiment may include a preferred combination of features, it is within the scope of certain aspects of the present invention for the embodiment to include only one (1) or less than all of the disclosed features, unless the specification expressly states otherwise or as might be understood by one of ordinary skill in the art.

Therefore, embodiments of the present invention are not necessarily limited to the combination(s) of features described above.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. A carrier system for holding and facilitating access to a plurality of implements usable with any one of a variety of tools, wherein said tools have distinctive carrier-receiving portions, said carrier system comprising:

a universal holder defining a plurality of implement-receiving openings, each of which is configured to receive a corresponding one of the implements therein; and a plurality of distinctive tool-attaching adapters, each being engageable with and complementally corresponding to a respective one of the carrier-receiving portions, said universal holder being individually securable to the tool-attaching adapters, said universal holder being mountable to each of the tools upon engagement of a selected one of the tool-attaching adapters with the respective one of the carrier-receiving portions, attachment of the selected one of the tool-attaching adapters to the respective one of the carrier-receiving portions, and securement of the universal holder to the selected one of the tool-attaching adapters, each of said tool-attaching adapters defining a tool-attaching opening therethrough, said carrier system including a tool-attaching fastener configured to extend through the tool-attaching opening and into the respective one of the carrier-receiving portions.

2. The carrier system of claim 1, said universal holder including— a body defining the plurality of implement-receiving openings, and a plurality of resiliently deformable securement elements each configured to selectively secure the corresponding one of the implements in the corresponding one of the implement-receiving openings.

3. The carrier system of claim 2, each of said securement elements being shiftable among neutral and loaded configurations, each of said securement elements configured to engage and apply force to the corresponding one of the implements when in the loaded configuration.

4. The carrier system of claim 3, each of said securement elements being at least in part disposed within the corresponding one of the implement-receiving openings when in the neutral configuration.

5. The carrier system of claim 4, each of said securement elements including a resiliently deflectable actuator and a shiftable engagement component, wherein shifting of the engagement component corresponds to deflection of the actuator, said engagement component at least in part obstructing a corresponding one of the implement-receiving openings when the securement element is in the neutral position, such that insertion of an implement into the implement-receiving opening results in contact between the implement and the engagement component, resultant deflection of the actuator, and shifting of the securement element into the loaded configuration.

6. The carrier system of claim 1, each of said tool-attaching adapters defining a recess for at least in part receiving the respective one of the carrier-receiving portions.

7. The carrier system of claim 1, said holder being symmetrical across a holder midplane extending orthogonally relative to the implement-receiving openings, said carrier system being symmetrical across the holder midplane.

8. A carrier system for holding and facilitating access to a plurality of implements usable with any one of a variety of tools, wherein said tools have distinctive carrier-receiving portions, said carrier system comprising:

a universal holder defining a plurality of implement-receiving openings, each of which is configured to receive a corresponding one of the implements therein;

a plurality of distinctive tool-attaching adapters, each being engageable with and complementally corresponding to a respective one of the carrier-receiving portions, said universal holder being individually securable to the tool-attaching adapters, said universal holder being mountable to each of the tools upon engagement of a selected one of the tool-attaching adapters with the respective one of the carrier-receiving portions, attachment of the selected one of the tool-attaching adapters to the respective one of the carrier-receiving portions, and securement of the universal holder to the selected one of the tool-attaching adapters, said universal holder defining an adapter-attaching opening therethrough; and an adapter-attaching fastener extending through the adapter-attaching opening and into the selected one of the adapters.

9. The carrier system of claim 8, said universal holder including— a body defining the plurality of implement-receiving openings, and a plurality of resiliently deformable securement elements each configured to selectively secure the corresponding one of the implements in the corresponding one of the implement-receiving openings.

10. The carrier system of claim 9, each of said securement elements being shiftable among neutral and loaded configurations, each of said securement elements configured to engage and apply force to the corresponding one of the implements when in the loaded configuration.

11. The carrier system of claim 10, each of said securement elements being at least in part disposed within the corresponding one of the implement-receiving openings when in the neutral configuration.

12. The carrier system of claim 11, each of said securement elements including a resiliently deflectable actuator and a shiftable engagement component, wherein shifting of the engagement component corresponds to deflection of the actuator, said engagement component at least in part obstructing a corresponding one of the implement-receiving openings when the securement element is in the neutral position, such that insertion of an implement into the implement-receiving opening results in contact between the implement and the engagement component, resultant deflection of the actuator, and shifting of the securement element into the loaded configuration.

13. The carrier system of claim 8, each of said tool-attaching adapters defining a recess for at least in part receiving the respective one of the carrier-receiving portions.

14. The carrier system of claim 8, said holder being symmetrical across a holder midplane extending orthogonally relative to the implement-receiving openings, said carrier system being symmetrical across the holder midplane.

15. A tool system comprising:

a tool for use with any of a plurality of implements; and a carrier system for holding and facilitating access to the implements, said tool defining a distinctive carrier-receiving portion, said carrier system including— a universal holder defining a plurality of implement-receiving openings, each of which is configured to receive a corresponding one of the implements therein, and a plurality of distinctive tool-attaching adapters, said universal holder being individually securable to the tool-attaching adapters, a selected one of said tool-attaching adapters engageable with and complementally corresponding to the carrier-receiving portion of the tool, said universal holder being mounted to the tool when the universal holder is secured to the selected one of the tool-attaching adapters engaged with the carrier-receiving portion and attached to the tool, each of said tool-attaching adapters defining a tool-attaching opening therethrough, said carrier system including a tool-attaching fastener extending through the tool-attaching opening and into the respective one of the carrier-receiving portions.

16. The tool system of claim 15, said universal holder including— a body defining the plurality of implement-receiving openings, and a plurality of resiliently deformable securement elements each configured to selectively secure the corresponding one of the implements in the corresponding one of the implement-receiving openings.

17. The tool system of claim 16, each of said securement elements being shiftable among neutral and loaded configurations and configured to engage and apply force to the corresponding one of the implements when in one of the loaded configurations, each of said securement elements including a resiliently deflectable actuator and an engagement component shiftable in correspondence with deflection of the actuator, each of said engagement components at least in part obstructing the corresponding one of the implement-receiving openings when the securement element is in the neutral position, such that insertion of an implement into the implement-receiving opening results in contact between the implement and the engagement component, resultant deflection of the actuator, and shifting of the securement element into the loaded configuration.

18. The tool system of claim 15, each of said tool-attaching adapters defining a recess, said recess of the selected one of said tool-attaching adapters at least in part receiving the carrier-receiving portion of the tool.

19. A tool system comprising:

a tool for use with any of a plurality of implements; and a carrier system for holding and facilitating access to the implements, said tool defining a distinctive carrier-receiving portion, said carrier system including— a universal holder defining a plurality of implement-receiving openings, each of which is configured to receive a corresponding one of the implements therein, and a plurality of distinctive tool-attaching adapters, said universal holder being individually securable to the tool-attaching adapters, a selected one of said tool-attaching adapters engageable with and complementally corresponding to the carrier-receiving portion of the tool, said universal holder being mounted to the tool when the universal holder is secured to the selected one of the tool-attaching adapters engaged with the carrier-receiving portion and attached to the tool, said universal holder defining an adapter-attaching opening therethrough, said carrier system including an adapter-attaching fastener extending through the adapter-attaching opening and into the selected one of the adapters.

20. The tool system of claim 19, said universal holder including— a body defining the plurality of implement-receiving openings, and a plurality of resiliently deformable securement elements each configured to selectively secure the corresponding one of the implements in the corresponding one of the implement-receiving openings.

21. The tool system of claim 20, each of said securement elements being shiftable among neutral and loaded configurations and configured to engage and apply force to the corresponding one of the implements when in one of the loaded configurations, each of said securement elements including a resiliently deflectable actuator and an engagement component shiftable in correspondence with deflection of the actuator, each of said engagement components at least in part obstructing the corresponding one of the implement-receiving openings when the securement element is in the neutral position, such that insertion of an implement into the implement-receiving opening results in contact between the implement and the engagement component, resultant deflection of the actuator, and shifting of the securement element into the loaded configuration.

22. The tool system of claim 19, each of said tool-attaching adapters defining a recess, said recess of the selected one of said tool-attaching adapters at least in part receiving the carrier-receiving portion of the tool.

* * * * *